T. P. STEADMAN.
TRANSMISSION MECHANISM.
APPLICATION FILED DEC. 14, 1911.

1,054,468.

Patented Feb. 25, 1913.

WITNESSES

INVENTOR
Thomas P. Steadman
BY
ATTORNEYS

UNITED STATES PATENT OFFICE.

THOMAS P. STEADMAN, OF ELSIE, MICHIGAN.

TRANSMISSION MECHANISM.

1,054,468. Specification of Letters Patent. Patented Feb. 25, 1913.

Application filed December 14, 1911. Serial No. 665,636.

*To all whom it may concern:*

Be it known that I, THOMAS P. STEADMAN, a citizen of the United States, and a resident of Elsie, in the county of Clinton and State of Michigan, have invented a new and Improved Transmission Mechanism, of which the following is a full, clear, and exact description.

My invention relates to a power transmission mechanism for generators or wherever a positive uniform drive is desired from a spasmodic or non-uniform drive, and in this specification, the invention will be described particularly with reference to the actuation of the rotatable member of an electric generator driven from an internal combustion engine. In this art, especially where the generator is used for the production of light energy, it is well known that when the generator is driven by a gas or gasolene engine, each explosion of the cylinder of the motor produces a temporary acceleration of speed, even when heavy balance wheels are used, which, of course, causes a fluctuation of the light synchronously with the explosions in the cylinder.

One object of my invention is to cushion the sudden acceleration of spasmodically rotating members to, in effect, store the unevenness of power, so that it may afterward be utilized over a longer period of time, and which, in the case of the generator, will produce a steady even current.

Reference is to be had to the accompanying drawings, forming a part of this specification, in which similar characters of reference indicate corresponding parts in all the figures, and in which—

Figure 1:
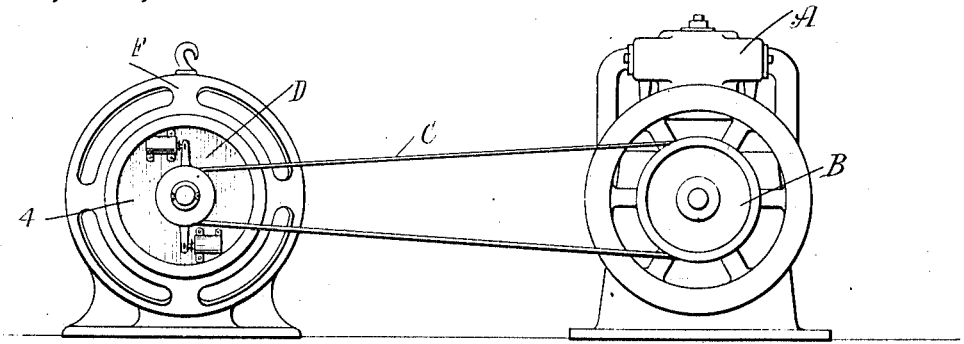
Figures 2, 3:
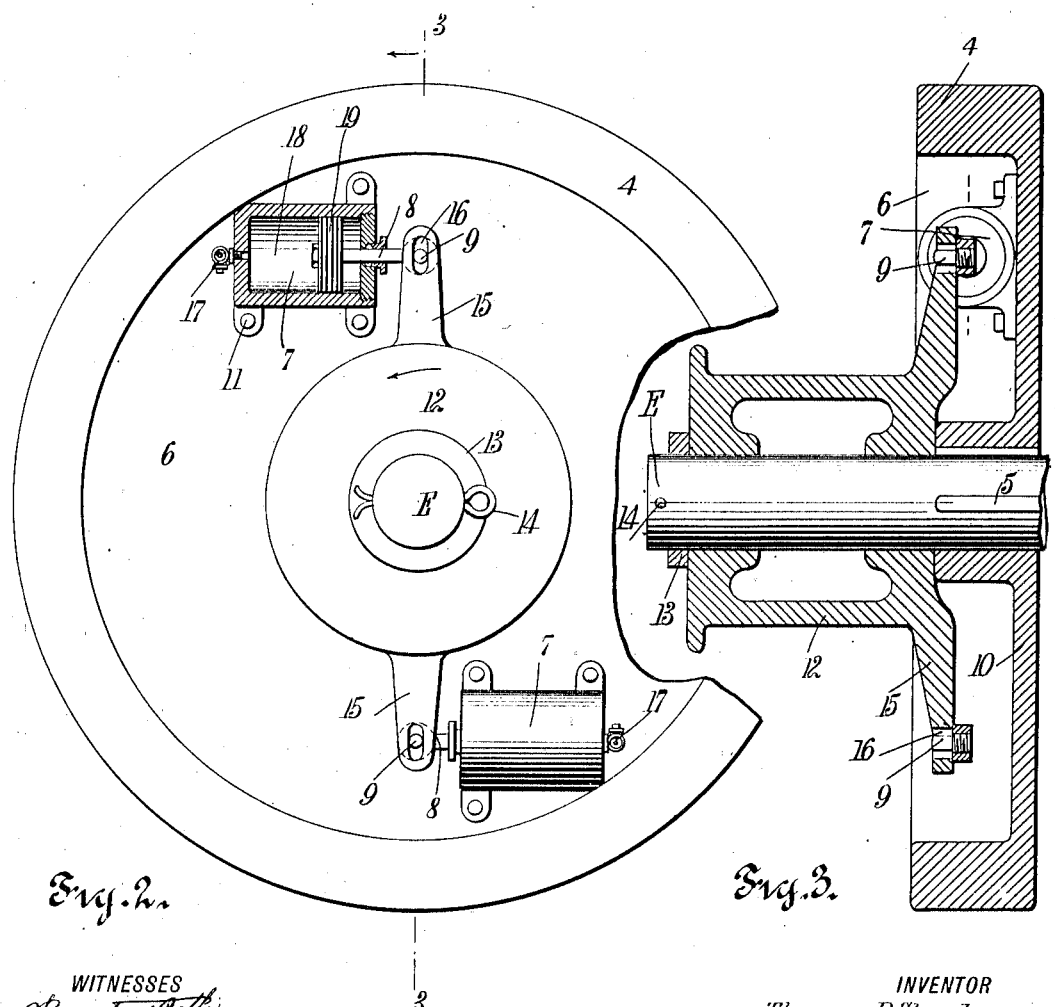

Figure 1 is a side elevation showing a conventional form of internal combustion engine belted to a dynamo, which dynamo carries on its armature shaft, a preferred embodiment of my invention; Fig. 2 is an enlarged face view of my improved transmission device as shown in Fig. 1, and Fig 3 is a transverse sectional view taken on the plane indicated by the line 3—3 of Fig. 2 and looking in the direction of the arrow.

Described more in detail, I have shown a prime mover A. of any suitable character, in this case shown to be an internal combustion engine, from the drive wheel B of which is driven a belt connection C, which in turn is connected to my improved power transmission D, said power transmission being mounted upon a rotating armature shaft E of an electric generator F.

Describing the power transmission mechanism in detail, there is mounted upon the shaft E, a balance wheel 4, preferably of some heavy material, keyed to the shaft by means of any suitable form of key 5, or otherwise rigidly mounted upon said shaft. This power wheel has one face, preferably the outer face, recessed to form a ring pocket 6 concentrically disposed with reference to the shaft D. Mounted within said pocket 6 and on diametrically opposite sides of the shaft E, is a pair of dash pots 7 extending parallel to each other, the piston rods 8 of which extend in opposite directions and have extending outwardly from their outer ends, pivot pins 9, which pivot pins are in a diameter of said balance wheel. These dash pots are rigidly fastened to the back wall 10 of the pocket 6, by bolts 11, or other suitable connections. Loosely mounted upon said shaft and on the side of the balance wheel having the pocket, is a pulley 12, of any suitable construction, held on said shaft by a washer 13 and cotter pin 14. Extending from the inner rim of the pulley, is a pair of diametrically-extending arms 15, each arm having, adjacent its outer end, a longitudinally-extending slot 16, containing the pin 9, so as to form a sliding pin-and-slot connection between the piston rod of the dash pot and the pulley 12, which pulley is driven by means of the belt connection C with the prime mover A. Each of the dash pots 7 is fitted with a suitable form of valve inlet 17, by means of which compressed air is stored in the chamber 18 in rear of the piston head 19 of the dash pot.

It will be understood that the pulley 12 is driven in the direction indicated by the arrow (Fig. 2), and motion will be transmitted through the arms 15 and rods 8 and tend to compress the air in the chamber 18, thereby forming a fluid connection between the balance wheel mounted on the shaft E and the motor-driven pulley 12. Should a sudden spasmodic uneven motion be given on the pulley 12, the jar will be transmitted to the compressed fluid in the chamber 18 and will tend to further compress the fluid in said chamber rather than jerk the balance wheel 14 about, the fluid in the chamber 18 gradually reassuming its normal form, and thereby transmitting to the balance wheel this sudden impulse over a longer period of time.

Having thus described my invention, I claim as new and desire to secure by Letters Patent:

1. In combination with a shaft, a balance wheel rigidly keyed to said shaft, a pair of diametrically disposed dash pots carried on one face thereof parallel to each other and having their piston rods projecting therefrom, in opposite directions, a pivot pin carried by each rod and projecting from the same normal to the plane of said wheel, a pulley loosely mounted on said shaft, and a pair of diametrically extending arms projecting therefrom, each of said arms having a longitudinal slot adjacent its outer end and containing the pin on the adjacent piston rod.

2. In combination, a shaft, a balance wheel rigidly mounted upon said shaft, a dash pot carried by the balance wheel, a pulley loosely mounted on said shaft and having an arm, and a pin-and-slot connection between said arm and the piston of said dash pot.

3. In combination with a shaft, a balancing wheel rigidly mounted on said shaft and having one face recessed to form a ring pocket, a pair of dash pots rigidly fastened to the back wall of said pocket, the said dash pots being arranged on diametrically opposite sides of the shaft, and a pulley loose on said shaft and pivotally connected to the piston of each of said dash pots.

In testimony whereof I have signed my name to this specification in the presence of two subscribing witnesses.

THOMAS P. STEADMAN.

Witnesses:
  LA MOTT G. BATES,
  DUAINE COX.